(12) United States Patent
Srinivasan et al.

(10) Patent No.: US 10,539,058 B2
(45) Date of Patent: Jan. 21, 2020

(54) OXYGEN CORRECTION FOR ENGINE-OUT NOX ESTIMATES USING A NOX SENSOR OF AN AFTERTREATMENT SYSTEM

(71) Applicant: Cummins Emission Solutions Inc., Columbus, IN (US)

(72) Inventors: Sriram Srinivasan, Greenwood, IN (US); Nassim Khaled, Decatur, GA (US); Priya Naik, San Diego, CA (US)

(73) Assignee: Cummins Emission Solutions Inc., Columbus, IN (US)

(*) Notice: Subject to any disclaimer, the term of this patent is extended or adjusted under 35 U.S.C. 154(b) by 67 days.

(21) Appl. No.: 15/747,592

(22) PCT Filed: Jul. 29, 2016

(86) PCT No.: PCT/US2016/044726
§ 371 (c)(1),
(2) Date: Jan. 25, 2018

(87) PCT Pub. No.: WO2017/023758
PCT Pub. Date: Feb. 9, 2017

(65) Prior Publication Data
US 2018/0216512 A1 Aug. 2, 2018

Related U.S. Application Data

(60) Provisional application No. 62/201,337, filed on Aug. 5, 2015.

(51) Int. Cl.
*F01N 3/20* (2006.01)
*F01N 3/08* (2006.01)
(Continued)

(52) U.S. Cl.
CPC ......... *F01N 3/2066* (2013.01); *B01D 53/944* (2013.01); *B01D 53/9418* (2013.01);
(Continued)

(58) Field of Classification Search
CPC ...... F01N 3/0814; F01N 3/2066; F01N 3/208; F01N 11/007; F01N 2560/025; F01N 2560/026
See application file for complete search history.

(56) References Cited

U.S. PATENT DOCUMENTS

| 7,505,949 | B2 | 3/2009 | Grichnik | |
| 8,256,205 | B2* | 9/2012 | Weber | B01D 53/30 60/276 |
| 8,915,063 | B2 | 12/2014 | Auckenthaler | |
| 2002/0017467 | A1* | 2/2002 | Ando | F01N 3/0842 205/781 |

(Continued)

OTHER PUBLICATIONS

International Search Report and Written Opinion issued for PCT/US2016/044726, dated Oct. 6, 2016, 15 pages.

*Primary Examiner* — Audrey K Bradley
(74) *Attorney, Agent, or Firm* — Foley & Lardner LLP (57) ABSTRACT

An aftertreatment system comprises a SCR system including at least one catalyst. A NOx sensor is positioned downstream of the SCR system. A controller is configured to determine an estimated engine NOx amount in the exhaust gas produced by an engine fluidly coupled to the aftertreatment system. The controller interprets an output value indicative of a first amount of oxygen in the exhaust gas downstream of the SCR system. The controller determines an adjusted engine NOx amount in response to the output value. A NOx sensor is positioned downstream of the selective catalytic reduction system and communicatively coupled to the controller. The NOx sensor is structured to provide the output value.

23 Claims, 5 Drawing Sheets

(51) Int. Cl.
  *F01N 11/00*   (2006.01)
  *B01D 53/94*   (2006.01)
  *F01N 3/021*   (2006.01)

(52) U.S. Cl.
  CPC ..... *B01D 53/9431* (2013.01); *B01D 53/9436* (2013.01); *B01D 53/9477* (2013.01); *B01D 53/9495* (2013.01); *F01N 3/021* (2013.01); *F01N 3/0814* (2013.01); *F01N 11/007* (2013.01); *B01D 2255/1021* (2013.01); *B01D 2255/1023* (2013.01); *B01D 2255/1025* (2013.01); *B01D 2255/2065* (2013.01); *B01D 2255/2073* (2013.01); *B01D 2255/20723* (2013.01); *B01D 2255/20738* (2013.01); *B01D 2255/20761* (2013.01); *B01D 2255/904* (2013.01); *F01N 2560/025* (2013.01); *F01N 2560/026* (2013.01); *F01N 2570/14* (2013.01)

(56) References Cited

U.S. PATENT DOCUMENTS

| | | | |
|---|---|---|---|
| 2004/0250533 A1* | 12/2004 | Ketterer | F02D 41/0245 |
| | | | 60/277 |
| 2005/0132698 A1 | 6/2005 | Nagaoka et al. | |
| 2009/0229356 A1* | 9/2009 | Kariya | F02D 41/146 |
| | | | 73/114.73 |
| 2011/0072783 A1 | 3/2011 | Hepburn et al. | |
| 2011/0138874 A1 | 6/2011 | Murase | |
| 2011/0166768 A1* | 7/2011 | Yamaoka | F02D 41/0245 |
| | | | 701/103 |
| 2012/0060469 A1 | 3/2012 | Gady et al. | |
| 2013/0085733 A1 | 4/2013 | Vartia et al. | |
| 2014/0069097 A1 | 3/2014 | Yasui et al. | |
| 2014/0373512 A1* | 12/2014 | Yokoi | G01N 27/4065 |
| | | | 60/276 |
| 2016/0115883 A1* | 4/2016 | Mischler | F02D 41/0072 |
| | | | 123/703 |

* cited by examiner

OXYGEN CORRECTION FOR ENGINE-OUT NOX ESTIMATES USING A NOX SENSOR OF AN AFTERTREATMENT SYSTEM

CROSS-REFERENCE TO RELATED APPLICATIONS

The present application is a National Stage Application of PCT Application No. PCT/US2016/044726, filed Jul. 29, 2016, which claims priority to U.S. Provisional Patent Application No. 62/201,337, filed Aug. 5, 2015. The contents of both applications are hereby incorporated by reference in their entirety.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to, in the presence of ammonia ($NH_3$), convert NOx (NO and $NO_2$ in some fraction) into harmless nitrogen gas ($N_2$) and water vapor ($H_2O$).

In order to meet increasingly strict NOx emission requirements and regulations, the concentration of the NOx gas in the exhaust gas emerging from the engine is estimated to control the operation of the aftertreatment system, for example the SCR system included in the aftertreatment system. For example, based on the estimated engine NOx amount, an amount of reductant to be inserted into the SCR system can be controlled and/or a temperature of the SCR system can be controlled. The estimated engine NOx amount can be estimated based on one or more engine operational parameters, for example engine speed, load, lean or rich operating conditions, fueling conditions, etc.

The estimated NOx concentration in the exhaust gas produced by the engine is adjusted for the amount of oxygen in the exhaust gas. In a number of conventional aftertreatment systems, the estimated engine NOx amount is adjusted using an oxygen concentration measured from a physical oxygen sensor. However, the inclusion of a physical oxygen sensor increases the cost of the system, and the reliability of the system is subject to the oxygen sensor functioning properly.

SUMMARY

Embodiments described herein relate generally to systems and methods for adjusting an estimated amount of NOx in an exhaust gas produced by an engine coupled to an aftertreatment system. In various implementations, the estimated engine NOx amount in an exhaust gas produced by an engine is adjusted for variations in the amount of oxygen in the exhaust gas using an amount of oxygen or oxygen concentration measured by a NOx sensor positioned downstream of an SCR system included in the aftertreatment system. In various embodiments, an engine out oxygen sensor and/or NOx sensor can be excluded from such aftertreatment systems reducing operational and/or maintenance costs.

In various embodiments, an aftertreatment system comprises a SCR system including at least one catalyst configured to decompose constituents of an exhaust gas flowing through the aftertreatment system. A controller is configured to determine an estimated engine NOx amount in the exhaust gas produced by an engine fluidly coupled to the aftertreatment system. The controller interprets an output value indicative of a first amount of oxygen in the exhaust gas downstream of the SCR system. The controller determines an adjusted engine NOx amount in response to the output value. A NOx sensor is positioned downstream of the selective catalytic reduction system and communicatively coupled to the controller. The NOx sensor is structured to provide the output value.

In further embodiments, a method for controlling operations of an aftertreatment system is provided. The method comprising, determining an estimated engine NOx amount in exhaust gas produced by an engine fluidly coupled to the aftertreatment system; interpreting an output value indicative of a first amount of oxygen in the exhaust gas downstream of a selective catalytic reduction system; determining an adjusted engine NOx amount in response to the output value; and controlling an operation of the selective catalytic reduction system based upon the determined adjusted engine NOx amount.

In still further embodiments, a controller for use with an aftertreatment system is provided. An estimated engine NOx amount determining circuit is configured to determine an estimated engine NOx amount in an exhaust gas produced by an engine fluidly coupled to the aftertreatment system. A first oxygen amount determining circuit is configured to interpret an output value indicative of a first amount of oxygen in the exhaust gas downstream of a selective catalytic reduction system. An adjustment module is configured to determine an adjusted engine NOx amount in response to the output value.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for adjusting an estimated amount of NOx in an exhaust gas produced by an engine coupled to an aftertreatment system. In various implementations, the estimated engine NOx amount in an exhaust gas produced by an engine is adjusted for variations in the amount of oxygen in the exhaust gas using an amount of oxygen or oxygen concentration measured by a NOx sensor positioned downstream of an SCR system included in the aftertreatment system. In various embodiments, an engine out oxygen sensor and/or NOx sensor can be excluded from such aftertreatment systems reducing operational and/or maintenance costs.

Various embodiments of the systems and methods for determining an adjusted NOx concentration measured by a NOx sensor of an aftertreatment system described herein may provide benefits including, for example: (1) adjusting an estimated engine NOx amount using an amount of oxygen or oxygen concentration in the exhaust gas measured by a NOx sensor positioned downstream of an SCR system; (2) allowing adjusting of the estimated engine NOx amount or concentration in instances where an oxygen sensor included in the aftertreatment system has malfunctioned or failed; and (3) allowing exclusion of an engine out oxygen sensor and/or engine out NOx sensor which are conventionally used for measuring oxygen and NOx concentration in the exhaust gas expelled from the engine.

Figure 1:
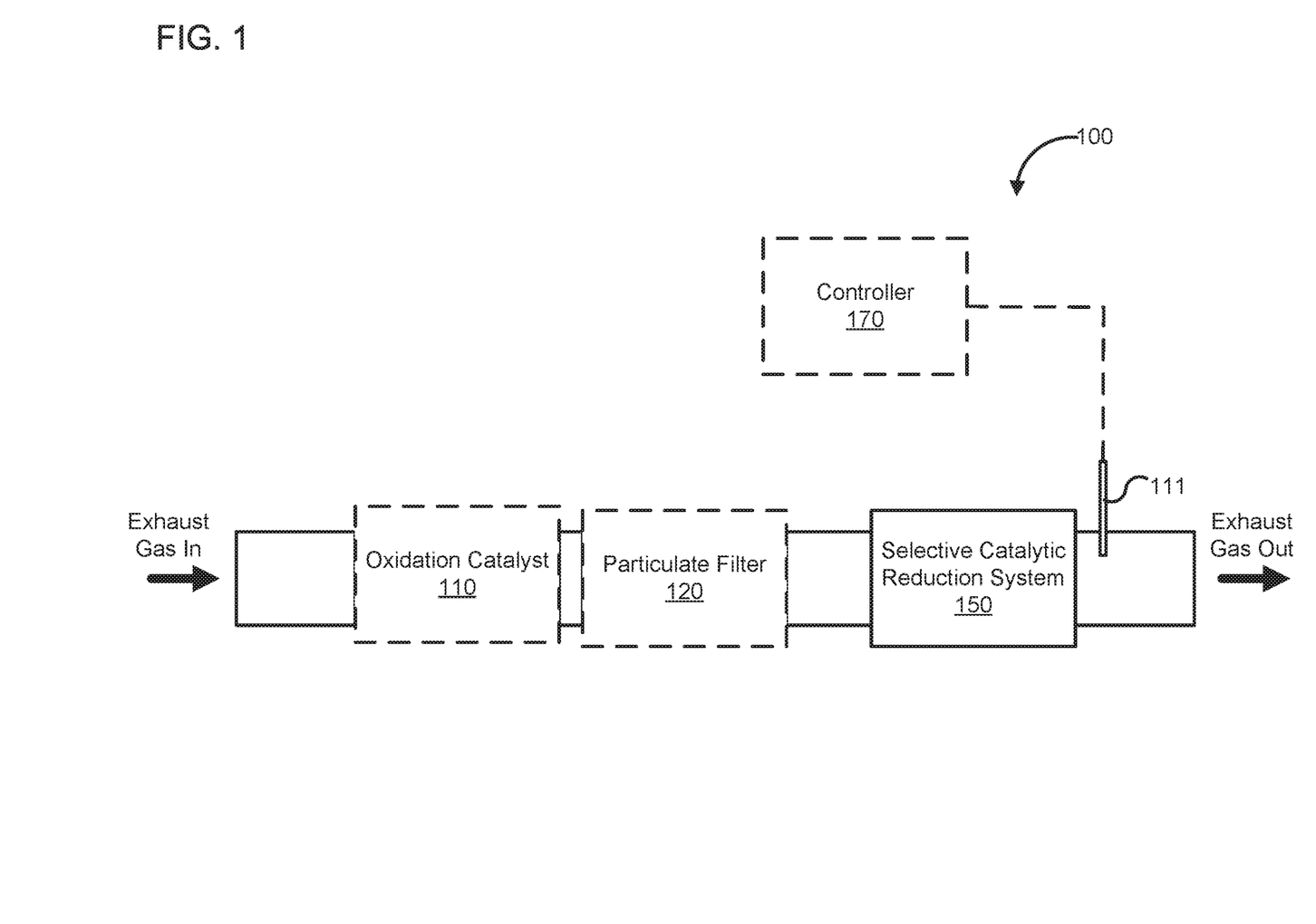
FIG. 1 is a schematic block diagram of an aftertreatment system, according to an embodiment.

FIG. 1 is a schematic illustration of an aftertreatment system 100 configured to receive an exhaust gas generated by an engine (e.g., a diesel engine) and decompose constituents of the exhaust gas. The aftertreatment system 100 includes an SCR system 150, a NOx sensor 111, a controller 170, and optionally an oxidation catalyst 110 and a particulate filter 120.

The oxidation catalyst 110 can be positioned upstream or downstream of the SCR system 150. In some embodiments, the oxidation catalyst 110 can include a diesel oxidation catalyst positioned upstream and/or downstream of the SCR system 150 and configured to decompose carbon monoxide and unburnt hydrocarbons, for example, methane, propane, ethane, etc. included in the exhaust gas. The diesel oxidation catalyst can comprise a Pt group catalyst, for example, a Pd—PdO catalyst. In other embodiments, the oxidation catalyst 110 can comprise an ammonia oxidation catalyst positioned downstream of the SCR system 150. The ammonia oxidation catalyst is configured to decompose any unused ammonia gas (e.g., produced by decomposition of a reductant inserted into the SCR system 150) included in the exhaust gas emerging from the SCR system 150.

The particulate filter 120 can be positioned downstream of the oxidation catalyst 110 and upstream of the SCR system 150. In various embodiments, the particulate filter 120 includes a diesel particulate filter configured to filter particulate matter (e.g., soot or carbon particles) from the exhaust gas. In other embodiments, the particulate filter 120 can comprise a selective catalyzed reduction filter (SCRF) configured to filter particulate matter from the exhaust gas as well as decompose constituents of the exhaust gas.

The SCR system 150 is configured to receive and decompose constituents (e.g., NOx gases) of the exhaust gas (e.g., diesel exhaust gas) flowing through the aftertreatment system. The SCR system 150 can be fluidly coupled to a reductant tank (not shown) and configured to receive a reductant (e.g., a diesel exhaust fluid such as an aqueous urea solution) therefrom. The reductant can be formulated to facilitate decomposition of the constituents (e.g., NOx gases) of the exhaust gas. The SCR system 150 includes at least one catalyst. The catalyst is formulated to selectively reduce constituents of the exhaust gas, for example, NOx included in the exhaust gas in the presence of the reductant. Any suitable catalyst can be used such as, for example, platinum, palladium, rhodium, cerium, iron, manganese, copper, vanadium based catalysts (including combinations thereof). In particular embodiments, the catalyst includes a NOx absorber catalyst.

The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalyst. Such washcoat materials can include, for example, aluminum oxide, titanium dioxide, silicon dioxide, any other suitable washcoat material, or a combination thereof. The exhaust gas can flow over and about the catalyst such that any NOx gases included in the exhaust gas are further reduced to yield an exhaust gas which is substantially free of carbon monoxide and NOx gases.

In various embodiments, the controller 170 is configured to determine an estimated engine NOx amount in the exhaust gas produced by the engine (e.g., a diesel engine) fluidly coupled to the aftertreatment system 100. This estimate engine NOx amount corresponds to an amount of NOx in the exhaust gas produced by the engine before passing through the components of the aftertreatment system 100, i.e., at an outlet of the engine. For example, the controller 170 can include algorithms, equations, instructions or lookup tables for determining the estimated engine NOx amount based on one or more operational parameters of the engine. Such operational parameters can include, but are not limited to, engine speed, load and lean or rich operating conditions, total fueling, etc. The estimated engine NOx amount is also dependent on a first amount of oxygen in the exhaust gas and needs to be adjusted or "lambda corrected" for the first amount of oxygen. The controller 170 is configured to use an output value of the NOx sensor 111 to determine the first amount of oxygen which is used for adjusting the estimated engine NOx amount, as described below.

The NOx sensor 111 is positioned downstream of the SCR system 150. The NOx sensor 111 is configured to measure a first amount of NOx or first NOx concentration of NOx gases included in the exhaust gas after flowing through the SCR system 150. In order to meet exhaust emission requirements, the NOx emissions from the aftertreatment system are closely monitored to ensure that the NOx concentration in the exhaust gas is within the emission regulations. In various embodiments, the NOx sensor 111 can include an electrochemical sensor. In such embodiments, the NOx sensor 111 can include a catalytic element (e.g., rhodium) to catalytically decompose the NOx gases into a nitrogen gas component and an oxygen gas component. The oxygen component of the NOx gases is electrochemically reduced, for example, on a polarized electrode in an oxygen reduction reaction to yield a first output value which includes a redox current and/or voltage indicative of the amount or concentration of the oxygen component of the NOx gases. The concentration of the oxygen components corresponds to the first NOx concentration of the NOx gases downstream of the SCR system 150 and is thereby used to indirectly measure the first NOx concentration.

However, the exhaust gas generated by the engine (e.g., a diesel engine) inherently includes an initial amount of oxygen or initial oxygen concentration. While the value of the initial oxygen concentration produced by the engine can vary, the initial oxygen concentration is not impacted as the exhaust gas flows through the aftertreatment system 100. The exhaust gas therefore includes a first oxygen concentration downstream of the SCR system 150 which is equal to the initial oxygen concentration of the exhaust gas (e.g., an oxygen concentration at a location near an inlet of the aftertreatment system 100). The first oxygen concentration also contributes to the electrochemical redox current measured by the NOx sensor and thereby the first output value. In other words, the first output value includes a first component corresponding to the first NOx concentration included in the exhaust gas and a second component which corresponds to the first oxygen concentration or first amount of oxygen of the exhaust gas.

In conventional systems, a separate oxygen sensor is used to determine the first oxygen concentration for adjusting the estimated engine NOx amount. In contrast, the NOx sensor 111 is also configured to measure the first oxygen concentration and produce an output value indicative of the first oxygen concentration as described above. For example, the NOx sensor 111 can include a first compartment for measuring the oxygen concentration and a second chamber for measuring the NOx concentration. At least a portion of the exhaust gas first flows through a diffusion barrier into the first chamber which includes a simple oxygen sensor (e.g., an electrochemical oxygen sensor) for measuring the first oxygen concentration. A portion of the exhaust gas also flows into the second chamber in which the first NOx concentration is measured as described before. The first oxygen concentration (or first amount of oxygen) is used to adjust the estimated engine NOx amount, as described below.

The controller 170 is in electrical communication with the NOx sensor 111 and is configured to receive the output signal from the NOx sensor 111 indicative of the first amount of oxygen. The signals can comprise, for example a voltage or a current (e.g., a redox current associated with the oxygen reduction reaction). Expanding further, the controller 170 is configured to interpret the output value indicative of the first amount of oxygen in the exhaust gas downstream of the SCR system 150. As described before, the first amount of oxygen downstream of the SCR system 150 is equal to an initial amount of oxygen of the exhaust gas at a location near an inlet of the aftertreatment system, i.e., the initial amount of oxygen in the exhaust gas produced by the engine. In other words, the first amount of oxygen is representative of the initial amount of oxygen in the exhaust gas when it is produced by the engine because the amount of oxygen remains relatively unchanged as the exhaust gas flows through the aftertreatment system 100.

The controller 170 determines an adjusted engine NOx amount in response to the output value, provided by the NOx sensor 111. For example, the controller 170 uses the output value indicative of the first amount of oxygen in the exhaust gas to adjust the estimated engine NOx amount and determine the adjusted engine NOx amount. The adjusted engine NOx amount represents a sufficiently accurate estimate of the amount of NOx in the exhaust gas produced by the engine prior to passing through the aftertreatment system 100 components.

In one embodiment, the controller 170 can adjust the estimated engine NOx amount to determine the adjusted engine NOx amount using the following equation:

$$NOx_{adjusted\text{-}eng} = NOx_{est\text{-}eng} + k(O_{2est} - O_{2first}) \quad (I)$$

where:
$NOx_{adjusted\text{-}eng}$ is the adjusted NOx amount,
$NOx_{est\text{-}eng}$ is the estimated NOx amount,
k is the constant,
$O_{2est}$ is the estimated amount of oxygen (as described with reference to equation II), and
$O_{2first}$ is the first amount of oxygen.

In this manner, the controller 170 can adjust the estimated engine NOx amount corresponding to an amount of NOx in the exhaust gas expelled from the engine prior to flowing through the components of the aftertreatment system 100, using the first amount of oxygen determined from the downstream NOx sensor 111. This can allow exclusion of an engine out oxygen sensor which is generally employed on conventional aftertreatment systems to determine the amount of oxygen in the exhaust gas and for adjusting the estimated engine NOx concentration. Furthermore, this also allows exclusion of an engine out NOx sensor (not shown) which is also generally included in conventional aftertreatment systems to measure the amount of NOx in the exhaust gas expelled from the engine.

The constant "k" is a temperature based constant which accounts for temperature variations in the exhaust gas which can impact the NOx sensor 111 measurements. A temperature sensor (not shown) can also be included in the aftertreatment system to measure the exhaust gas temperature downstream of the SCR system 150 which can be used to determine the constant k.

As noted above, $O_{2est}$ is the estimated amount of oxygen and can be determined or calculated in a variety of manners. For example, one example equation for determining the estimated amount of oxygen is follows:

$$O_{2est} = \beta(m_{EGR}, T_{EGR}, P_{EGR}, m_{Intake}, T_{Intake}, P_{Intake}) \quad (II)$$

where:
$m_{EGR}$: Mass of exhaust gas recirculated into the cylinder,
$T_{EGR}$: Temperature of the exhaust gas recirculated into the cylinder,
$P_{EGR}$: Pressure of the exhaust gas recirculated into the cylinder,
$m_{Intake}$: Mass of intake gas introduced into the cylinder,
$T_{Intake}$: Temperature of the intake gas introduced into the cylinder, and $P_{Intake}$: Pressure of the intake gas introduced into the cylinder.

In addition to equation (2) above, other variables such as humidity and cylinder pressure can be used in providing an estimation of the amount of oxygen.

In various implementations, the controller 170 is also configured to determine that an amount of stored oxygen stored by the at least one catalyst included in the SCR system 150 is below a minimum threshold. The oxygen stored by the at least one catalyst can also contribute to the the first oxygen concentration and thereby the output value measured by the NOx sensor 111. The controller 170 can ensure that the amount of stored oxygen in the catalyst remains below the minimum threshold, for example, a de minimus amount, or an amount which does not alter the output value by more than 1%.

The controller 170 can include a processor (e.g., a microcontroller) programmed to interpret the output value. In some embodiments, the controller 170 can be included in a control module (e.g., the control module 271 described herein) which is in electrical communication with one or more of the components of the aftertreatment system 100, as described herein and operable to perform the sensing and control functions described herein. In particular embodiments, the controller 170 can also be configured to receive and interpret data from temperature sensors, NOx sensors, oxygen sensors and/or ammonia sensors, each of which can be included in the aftertreatment system 100.

The controller 170 can include look up tables, algorithms or instructions, which can be stored on a computer-readable medium included in the controller 170. The instructions or algorithms on the computer-readable medium are executable by a computing device (e.g., the computing device 530) of the controller 170 (e.g., the microprocessor) to interpret the output value, and determine the adjusted engine NOx amount from the estimated engine NOx amount, as described above In particular embodiments, the controller 170 can also include algorithms (e.g., calibration equations) or look up tables to compare the output value for determining the the first oxygen concentration therefrom.

Figure 2:
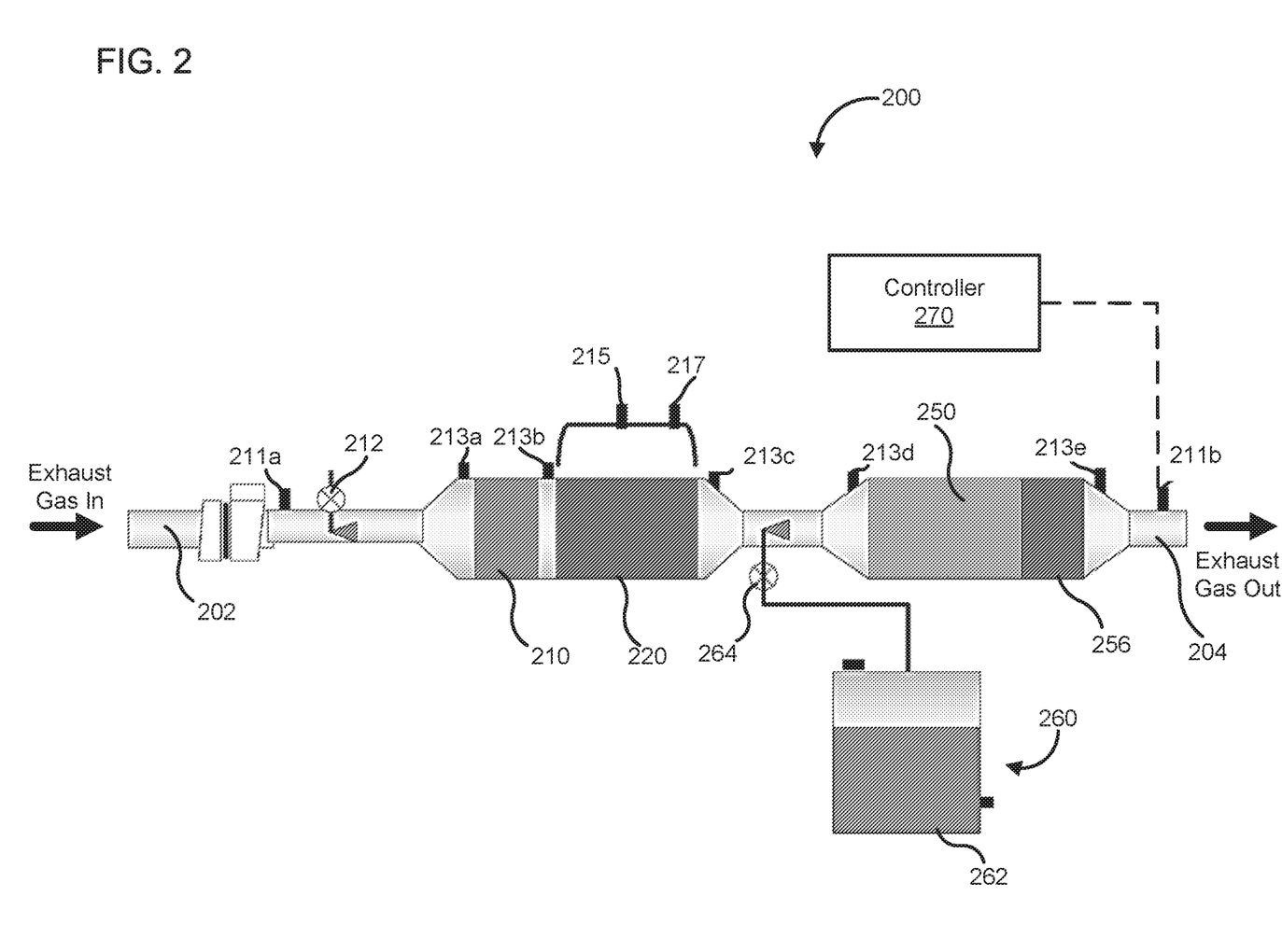
FIG. 2 is a schematic illustration of another embodiment of an aftertreatment system.

FIG. 2 is a schematic illustration of another embodiment of an aftertreatment system 200 for receiving an exhaust gas from an IC engine (e.g., the diesel engine) and decompose constituents (e.g., NOx gases) included in the exhaust gas. The aftertreatment system 200 includes an inlet 202, and outlet 204, a first oxidation catalyst 210, a particulate filter 220, an SCR system 250, a second oxidation catalyst 256 and a reductant insertion assembly 260.

The aftertreatment system 200 is configured to receive an exhaust gas (e.g., a diesel exhaust gas) via the inlet 202. A first NOx sensor 211a can optionally be disposed proximal to the inlet to measure an initial NOx concentration of the exhaust gas entering the aftertreatment system 200. The oxidation catalyst 210 is positioned downstream of the inlet. The oxidation catalyst 210 can include a diesel oxidation catalyst configured to decompose unburnt hydrocarbons and/or carbon monoxide included in the exhaust gas. A hydrocarbon insertion assembly 212 is positioned upstream of the oxidation catalyst 210 and downstream of the first NOx sensor 211a. The hydrocarbon insertion assembly 212 is configured to insert hydrocarbons into the exhaust gas stream to facilitate decomposition of the unburnt hydrocarbons and/or carbon monoxide by the oxidation catalyst 210 or to regenerate the oxidation catalyst 210.

A first temperature sensor 213a is positioned upstream of the oxidation catalyst and a second temperature sensor 213b is positioned downstream of the oxidation catalyst 210. The first temperature sensor 213a and the second temperature sensor 213b are configured to measure the temperature of the exhaust gas upstream and downstream of the oxidation catalyst 210.

The particulate filter 220 is positioned downstream of the second temperature sensor 213b. The particulate filter 220 can include, for example a diesel particulate filter or a catalyzed filter (e.g., a SCRF) and is configured to filter particulate matter, for example, soot or carbon particles from the exhaust gas. A differential pressure sensor 215 is positioned across the particulate filter 220 and configured to measure a differential pressure across the particulate filter 220. A pressure sensor 217 is also positioned downstream of the particulate filter 220 and configured to measure an exhaust gas pressure downstream of the particulate filter 220. A third temperature sensor 213c is positioned downstream of the particulate filter 220 and configured to measure a temperature of the exhaust gas downstream of the particulate filter 220.

The SCR system 250 is positioned downstream of the third temperature sensor 213c. The SCR system 250 includes at least one catalyst configured to decompose constituents (e.g., NOx gases) of the exhaust gas. The SCR system 250 can be substantially similar to the SCR system 150 described above and therefore, not described in further detail herein. The reductant insertion assembly 260 includes a reductant storage tank 262 containing a reductant formulated to facilitate decomposition of the constituents of the exhaust gas (e.g., a diesel exhaust gas) by the SCR system 250. The reductant insertion assembly 260 also includes a pumping assembly 264 which can include, for example pumps, valves, fluid communication lines and/or nozzles. The pumping assembly 264 is configured to insert the reductant contained within the reductant storage tank 262 into the exhaust gas stream upstream of the SCR system 250 and/or into the SCR system 250 Suitable reductants can include, for example an aqueous urea solution or a diesel exhaust fluid (e.g., the diesel exhaust fluid available under the tradename ADBLUE®). A fourth temperature sensor 213d is also positioned upstream of the SCR system 250 and configured to measure the temperature of the exhaust gas upstream of the SCR system 250.

The second oxidation catalyst 256 is positioned downstream of the SCR system 250. In particular embodiments, the second oxidation catalyst 256 is substantially the same as the first oxidation catalyst 210 (e.g., includes a diesel oxidation catalyst). In other embodiments, the second oxidation catalyst 256 includes an ammonia oxidation catalyst configured to decompose ammonia included in the exhaust gas (e.g., the ammonia obtained from decomposition of the reductant inserted into the SCR system 250).

A fifth temperature sensor 213e is positioned downstream of the SCR system 250 and configured to measure the exhaust gas temperature downstream of the SCR system 250. A second NOx sensor 211b is positioned proximal to the outlet 204 of the aftertreatment system 200. The second NOx sensor 211b can be substantially similar to the NOx sensor 111 included in the aftertreatment system 100 as described above. The second NOx sensor 211b is configured to measure a first amount of NOx or first NOx concentration of the exhaust gas downstream of the SCR system 250 and generate a first output value indicative of the first NOx concentration. The second NOx sensor 211b is also configured to measure a first amount of oxygen or first oxygen concentration of the exhaust gas downstream of the SCR system 250 and generate a second output value indicative of the first oxygen concentration, as described before with respect to the NOx sensor 111.

The controller 270 is in communication (e.g., electronic communication, wired communication, wireless communication, etc.) with the second NOx sensor 211b. The controller 270 can also be in communication with each of the first NOx sensor 211a, the temperature sensors 213a-e, the differential pressure sensor 215 and the pressure sensor 217 and configured to receive and interpret signals from each of these sensors. The controller 270 can also be in communication with the hydrocarbon insertion assembly 212 and the reductant insertion assembly 260 to control one or more functions thereof (e.g., instruct the hydrocarbon insertion assembly 212 and/or the reductant insertion assembly 260 to control a timing and/or an amount of hydrocarbons and reductant inserted into the exhaust gas stream, respectively).

In particular embodiments, the controller 270 can be substantially similar to the controller 170 included in the aftertreatment system 100. The controller 270 is configured to receive signals from the NOx sensor 211b indicative of the first output value and the second output value. The signals can include, for example a voltage or a current (e.g., a redox current associated with the oxygen reduction reaction). The controller 270 is configured to interpret the first output value and the second output value from the NOx sensor 211b indicative of the first NOx concentration and the first oxygen concentration in the exhaust gas downstream of the SCR system 250, respectively. In particular embodiments, the controller 270 determines the first NOx concentration from the first output value, and also determines the first oxygen concentration from the second output value. The controller 270 is configured to determine an estimated engine NOx amount as described before with respect to the controller 170. Furthermore, the controller determines an adjusted engine NOx amount from the estimated engine NOx amount using the second output value. For example, the controller 270 can use equation I to determine the adjusted engine NOx amount or concentration.

Figure 3:
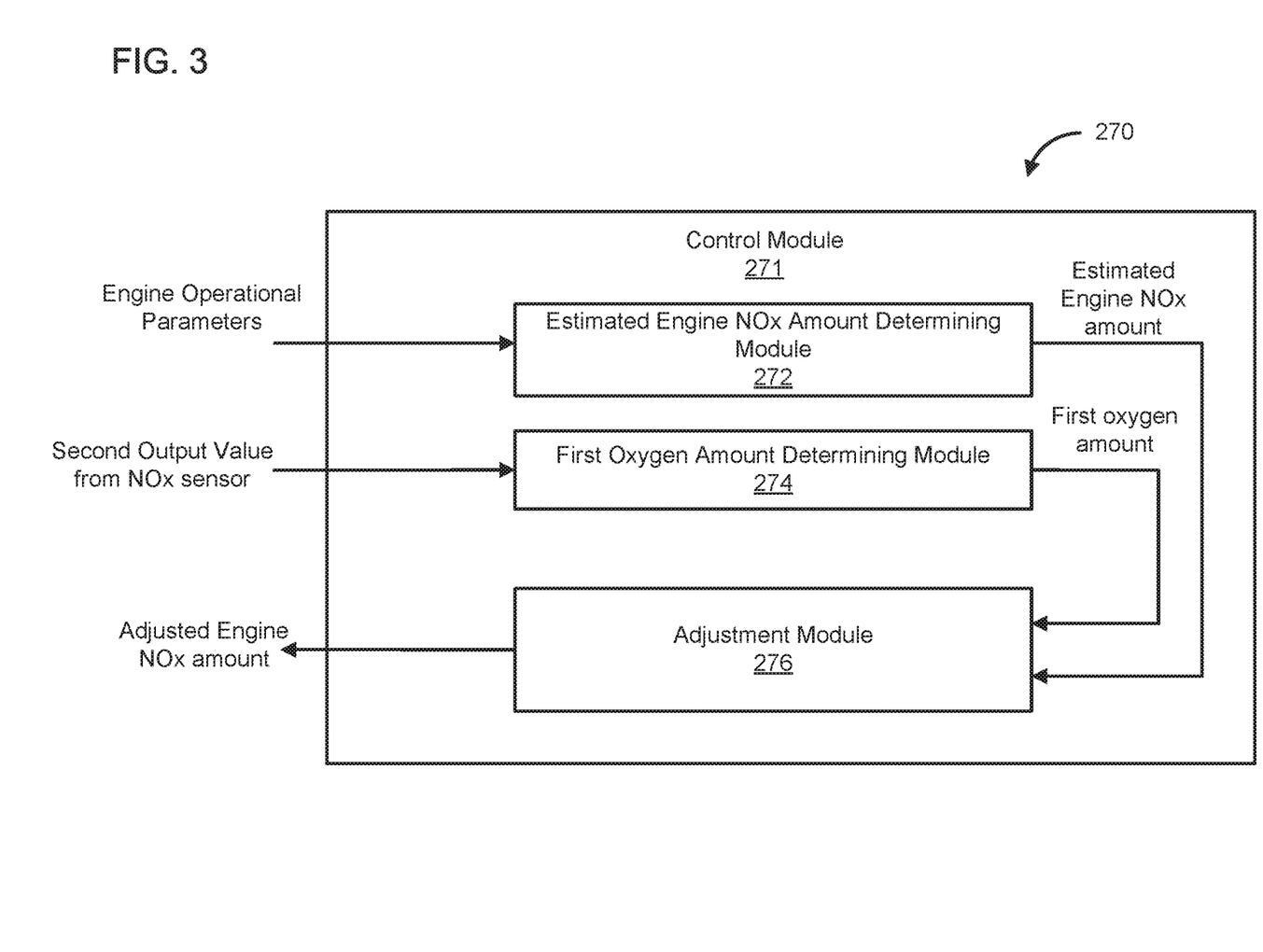
FIG. 3 is a schematic block diagram of an embodiment of a control module included in a controller of the aftertreatment system of FIG. 2.

In some embodiments, the controller 270 can be a system computer of an apparatus or system which includes the aftertreatment system 200 (e.g., a vehicle, a generator set, etc.). Such a computer can include, for example the computing device 530 described in detail herein with respect to FIG. 5. In particular embodiments, the controller 270 can include a control module which is in electrical communication with the second NOx sensor 211b and one or more of the components of the aftertreatment system 100 described herein and operable to perform the sensing functions described herein. For example, FIG. 3 is a schematic block diagram of a control module 271 included in a controller 270. The control module 271 includes an estimated engine NOx amount determining module or circuit 272, a first oxygen amount determining module or circuit 274, and an adjustment module or circuit 276.

The estimated engine NOx amount determining module 272 includes algorithms, engine load/speed curves, equations, instructions and/or lookup tables configured to use one or more engine operational parameters to determine the estimated engine NOx amount, as described above with respect to controller 170. In various embodiments, the estimated engine NOx amount determining module 272 can be operatively coupled to the engine generating the exhaust gas and configured to receive the engine operational parameters.

The first oxygen amount determining module 274 receives and interprets the second output signal from the second NOx sensor 211b and determines the first oxygen amount or first oxygen concentration therefrom. The adjustment module 276 receives the second output value and/or first oxygen concentration from the first oxygen amount determining module 274. Furthermore, the adjustment module 276 also receives the estimated engine NOx amount from the estimated engine NOx amount determining module 272. Using the first oxygen amount, the adjustment module 276 adjusts the estimated engine NOx amount to determine an adjusted engine NOx amount, for example using the equation I as described before. In particular embodiments, the temperature of the exhaust gas measured by the fifth temperature sensor 213e downstream of the SCR system 250 is used to determine the constant k included in equation I.

Figure 4:
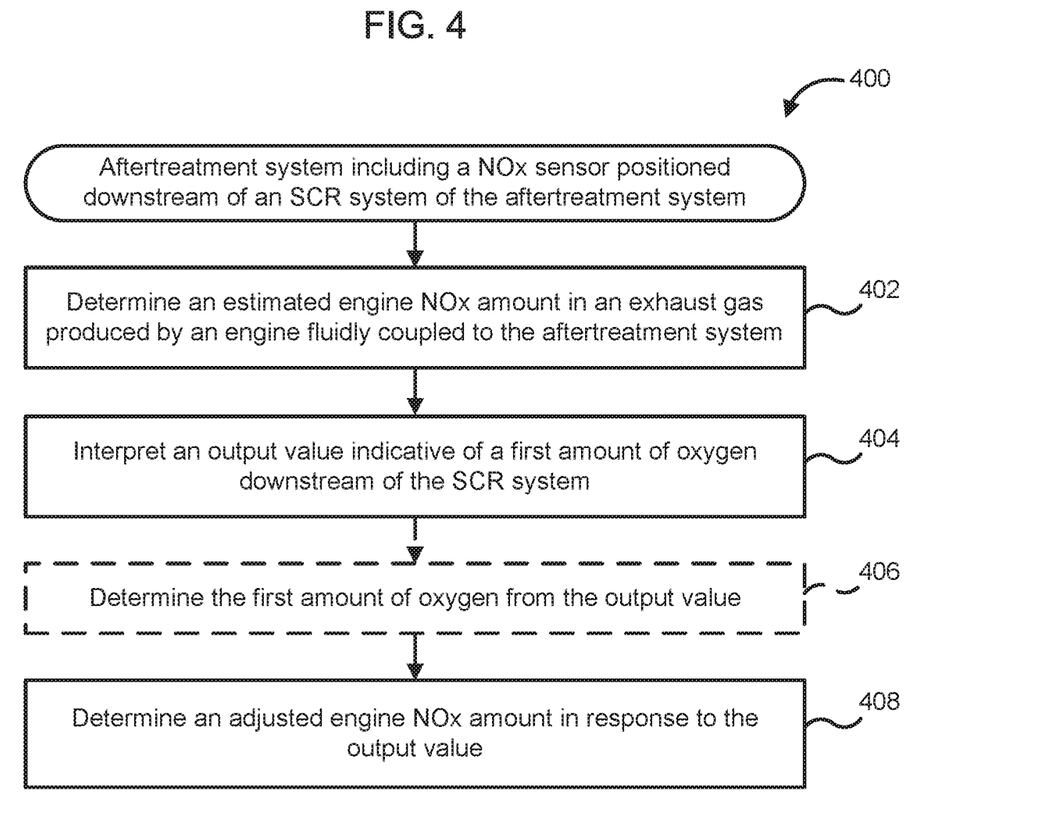
FIG. 4 is a schematic flow diagram of another embodiment of a method for adjusting an estimated engine NOx amount in an exhaust gas using a first amount of oxygen measured by a NOx sensor positioned downstream of an SCR system included in the aftertreatment system.

FIG. 4 is a schematic flow diagram of an example method 400 for adjusting an estimated engine NOx amount or concentration in an exhaust gas expelled from an engine using a NOx sensor (e.g., the NOx sensor 111 or 211b) positioned downstream of an SCR system (e.g., the SCR system 150 or 250) included in an aftertreatment system (e.g., the aftertreatment system 100 or 200) fluidly coupled to the engine using a first amount of oxygen or oxygen concentration measured by the NOx sensor. The operations of the method 400 can be stored in the form of instructions on a non-transitory computer-readable medium (e.g., the main memory 536, read only memory (ROM) 538 or storage device 540 included in the computing device 530 of FIG. 5). The computer-readable medium can be included in a computing device (e.g., the computing device 530) which is configured to execute the instructions stored on the computer-readable medium to perform the operations of the method 400. In particular embodiments, the operations of the method 400 can be stored in a computer-readable medium included in the controller 170 or 270 and configured to be executed by the controller 170 or 270.

The method 400 includes determining an estimated engine NOx amount in an exhaust gas produced by an engine fluidly coupled to the aftertreatment system at 402. For example, the controller 170 or 270 can be configured to estimate the estimated engine NOx amount based on one or more operational parameters of the engine, as described before, using algorithms, equations (e.g., the equation II), engine load/speed curves, instructions or lookup tables stored in the controller (e.g., stored the main memory 536, read only memory (ROM) 538 or storage device 540 included in the computing device 530 of FIG. 5).

An output value is interpreted which is indicative of the first amount of oxygen or oxygen concentration downstream of the SCR system at 404. For example, the NOx sensor (e.g., the NOx sensor 111 or 211b) can separately reduce the oxygen inherently included in the exhaust gas to provide the output value indicative of the first amount of oxygen, as described above. The output value can be interpreted by the controller, for example the controller 170 or 270 described above.

In some embodiments, the first amount of oxygen or oxygen concentration is determined from the output value at 406. For example, the controller (e.g., the controller 170 or 270) can include a first oxygen amount determining module (e.g., the first oxygen concentration determination module 274) configured to determine the first oxygen concentration from the output value, as described above.

An adjusted engine NOx amount or concentration is determined in response to the output value at 408. For example, the controller (e.g., the controller 170 or 270) can employ equation I to adjust the estimated engine NOx amount using the first oxygen concentration and determine the adjusted engine NOx amount therefrom. The adjusted engine NOx amount is a more accurate representation of the NOx concentration in the exhaust gas expelled from the engine before passing through the aftertreatment system (i.e., the amount of NOx in untreated exhaust gas expelled from the engine). This can allow more effective control of the SCR system positioned downstream of the engine to effectively decompose NOx gases and reduce the amount of NOx included in the exhaust gas to within acceptable limits. Moreover, this can also allow exclusion of engine out oxygen sensor and/or NOx sensor, thereby reducing manufacturing and/or maintenance costs.

Figure 5:
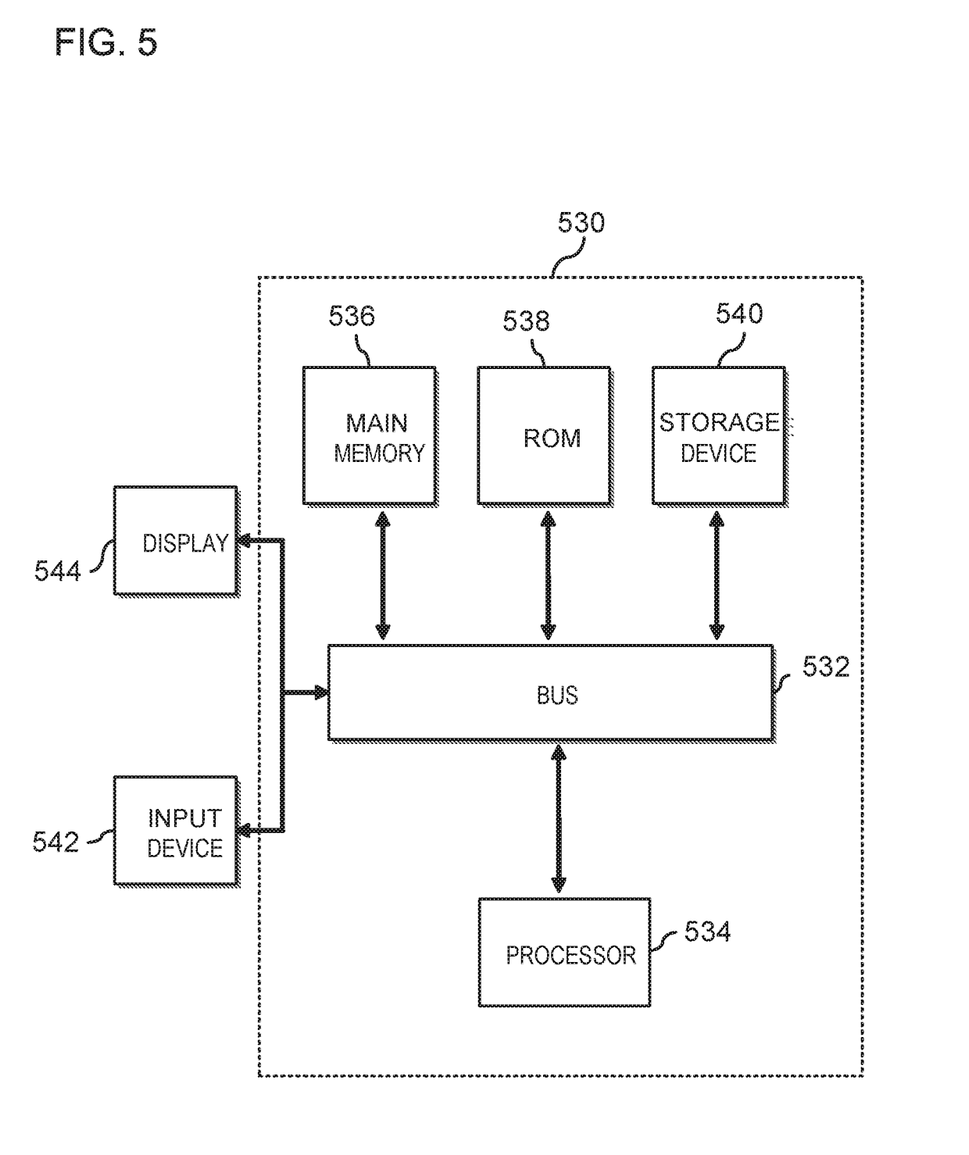
FIG. 5 is a schematic block diagram of a computing device which can be used as the controller of FIG. 1 and/or FIG. 2.

FIG. 5 is a block diagram of a computing device 530 in accordance with an illustrative implementation. The computing device can be used to perform any of the methods or the processes described herein, for example the method 400 as shown in FIG. 4. In some embodiments, the controller 170 or 270 can include the computing device 530. The computing device 530 includes a bus 532 or other communication component for communicating information. The computing device 530 can also include one or more processors 534 or processing circuits coupled to the bus for processing information.

The computing device 530 also includes main memory 536, such as a random access memory (RAM) or other dynamic storage device, coupled to the bus 532 for storing information, and instructions to be executed by the processor 534. Main memory 536 can also be used for storing position information, temporary variables, or other intermediate information during execution of instructions by the processor 534. The computing device 530 may further include a read only memory (ROM) 538 or other static storage device coupled to the bus 532 for storing static information and instructions for the processor 534. A storage device 540, such as a solid-state device, magnetic disk or optical disk, is coupled to the bus 532 for persistently storing information and instructions. Instructions for determining estimated engine NOx amount and the first oxygen amount can be stored on the storage device 540.

The computing device 530 may be coupled via the bus 532 to a display 535, such as a liquid crystal display, or active matrix display, for displaying information to a user. An input device 542, such as a keyboard or alphanumeric pad, may be coupled to the bus 532 for communicating information and command selections to the processor 534. In another implementation, the input device 542 has a touch screen display 544.

According to various implementations, the processes and methods described herein can be implemented by the computing device 530 in response to the processor 534 executing an arrangement of instructions contained in main memory 536 (e.g., the operations of the method 300). Such instructions can be read into main memory 536 from another non-transitory computer-readable medium, such as the storage device 540. Execution of the arrangement of instructions contained in main memory 536 causes the computing device 530 to perform the illustrative processes described herein. One or more processors in a multi-processing arrangement may also be employed to execute the instructions contained in main memory 536. In alternative implementations, hard-wired circuitry may be used in place of or in combination with software instructions to effect illustrative implementations. Thus, implementations are not limited to any specific combination of hardware circuitry and software.

Although an example computing device has been described in FIG. 5, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic values on a system or network. Where a module or portions of a module are implemented in software, the computer readable program code may be stored and/or propagated on in one or more computer readable medium(s).

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As utilized herein, the term "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system, comprising;
    a selective catalytic reduction system including at least one catalyst configured to decompose constituents of an exhaust gas flowing through the aftertreatment system;
    a controller configured to:

determine an estimated engine NOx amount in the exhaust gas produced by an engine fluidly coupled to the aftertreatment system,
interpret an output value indicative of a first amount of oxygen in the exhaust gas downstream of the selective catalytic reduction system, and
determine an adjusted engine NOx amount in response to the output value; and
a NOx sensor positioned downstream of the selective catalytic reduction system and communicatively connected with the controller, the NOx sensor structured to provide the output value.

2. The aftertreatment system of claim 1, wherein the controller is further configured to:
determine the first amount of oxygen from the output value.

3. The aftertreatment system of claim 2, wherein the controller is further configured to:
determine that an amount of stored oxygen stored by the at least one catalyst included in the selective catalytic reduction system is below a minimum threshold.

4. The aftertreatment system of claim 1, wherein the at least one catalyst includes a NOx absorber catalyst.

5. The aftertreatment system of claim 1, wherein the controller is configured to adjust the estimated amount of NOx to determine the adjusted NOx amount using the following formula:

$$NOx_{adjusted\text{-}eng}=NOx_{est\text{-}eng}+k(O_{2est}-O_{2first})$$

wherein:
$NOx_{adjusted\text{-}eng}$ is the adjusted engine NOx amount,
$NOx_{est\text{-}eng}$ is the estimated engine NOx amount,
k is a constant,
$O_{2est}$ is an estimated amount of oxygen, and
$O_{2first}$ is the first amount of oxygen.

6. The aftertreatment system of claim 5, wherein $O_{2est}$ is determined using the following formula:

$$O_{2est}=\beta(m_{\dot{E}GR},T_{EGR},P_{EGR},m_{Intake},T_{Intake},P_{Intake}) \quad (II)$$

wherein:
$m_{\dot{E}GR}$ is a mass of exhaust gas recirculated into an engine cylinder;
$T_{EGR}$ is a temperature of the exhaust gas recirculated into the engine cylinder;
$P_{EGR}$ is a pressure of the exhaust gas recirculated into the engine cylinder;
$m_{Intake}$ is a mass of intake gas introduced into the engine cylinder;
$T_{Intake}$ is a temperature of the intake gas introduced into the engine cylinder; and
$P_{Intake}$ a pressure of the intake gas introduced into the engine cylinder.

7. The aftertreatment system of claim 1, wherein the first amount of oxygen downstream of the selective catalytic reduction system is equal to an initial amount of oxygen of the exhaust gas at a location near an inlet of the aftertreatment system.

8. The aftertreatment system of claim 1, wherein the aftertreatment system further comprises:
an oxidation catalyst positioned upstream of the selective catalytic reduction system;
a particulate filter positioned downstream of the oxidation catalyst and upstream of the selective catalytic reduction system; and
a reductant insertion assembly fluidly coupled to the selective catalytic reduction system.

9. The aftertreatment system of claim 8, wherein the aftertreatment system further comprises:
an ammonia oxidation catalyst positioned downstream of the selective catalytic reduction system and upstream of the NOx sensor.

10. A method for controlling operations of an aftertreatment system, comprising:
determining an estimated engine NOx amount in exhaust gas produced by an engine fluidly coupled to the aftertreatment system;
interpreting an output value indicative of a first amount of oxygen in the exhaust gas downstream of a selective catalytic reduction system;
determining an adjusted engine NOx amount in response to the output value; and
controlling an operation of the selective catalytic reduction system based upon the determined adjusted engine NOx amount.

11. The method of claim 10, wherein the controlling the operation of the selective catalytic reduction system comprises adjusting an amount of reductant inserted into the catalytic reduction system based upon the adjusted engine NOx amount.

12. The method of claim 11, further comprising:
determining the first amount of oxygen from the output value.

13. The method of claim 12, further comprising:
determining that an amount of stored oxygen stored by at least one catalyst included in the selective catalytic reduction system is below a minimum threshold.

14. The method of claim 13, wherein the at least one catalyst includes a NOx absorber catalyst.

15. The method of claim 10, wherein the first amount of oxygen downstream of the selective catalytic reduction system is equal to an initial amount of oxygen of the exhaust gas at a location near an inlet of the aftertreatment system.

16. The method of claim 10, wherein the adjusted NOx amount is determined using the following formula:

$$NOx_{adjusted\text{-}eng}=NOx_{est\text{-}eng}+k(O_{2est}-O_{2first})$$

wherein:
$NOx_{adjusted\text{-}eng}$ is the adjusted engine NOx amount,
$NOx_{est\text{-}eng}$ is the estimated engine NOx amount,
k is a constant,
$O_{2est}$ is an estimated amount of oxygen, and
$O_{2first}$ is the first amount of oxygen.

17. The method of claim 16, wherein k is a temperature based constant which accounts for temperature variations in the exhaust gas.

18. The method of claim 16, wherein $O_{2est}$ is determined using the following formula:

$$O_{2est}=\beta(m_{\dot{E}GR},T_{EGR},P_{EGR},m_{Intake},T_{Intake},P_{Intake}) \quad (II)$$

wherein:
$m_{\dot{E}GR}$ is a mass of exhaust gas recirculated into an engine cylinder;
$T_{EGR}$ is a temperature of the exhaust gas recirculated into the engine cylinder;
$P_{EGR}$ is a pressure of the exhaust gas recirculated into the engine cylinder;
$m_{Intake}$ is a mass of intake gas introduced into the engine cylinder;
$T_{Intake}$ is a temperature of the intake gas introduced into the engine cylinder; and
$P_{Intake}$ a pressure of the intake gas introduced into the engine cylinder.

19. A controller for use with an aftertreatment system, comprising:
   an estimated engine NOx amount determining circuit configured to determine an estimated engine NOx amount in an exhaust gas produced by an engine fluidly coupled to the aftertreatment system;
   a first oxygen amount determining circuit configured to receive a signal from a NOx sensor disposed downstream of a selective catalytic reduction system and interpret the signal to determine an output value indicative of a first amount of oxygen in the exhaust gas downstream of the selective catalytic reduction system; and
   an adjustment module configured to:
      determine an adjusted engine NOx amount from the estimated engine NOx amount in response to the output value, and
      generate a signal corresponding to the adjusted engine NOx amount.

20. The controller of claim 19, wherein the first oxygen amount determining circuit is further configured to determine the first amount of oxygen from the output value.

21. The controller of claim 20, wherein the first amount of oxygen downstream of the selective catalytic reduction system is equal to an initial amount of oxygen of the exhaust gas at a location near an inlet of the aftertreatment system.

22. The controller of claim 19, wherein the adjusted NOx amount is determined using the following formula:

$$NOx_{adjusted\text{-}eng} = NOx_{est\text{-}eng} + k(O_{2est} - O_{2first})$$

wherein:
$NOx_{adjusted\text{-}eng}$ is the adjusted engine NOx amount,
$NOx_{est\text{-}eng}$ is the estimated engine NOx amount,
$k$ is a constant,
$O_{2est}$ is an estimated amount of oxygen, and
$O_{2first}$ is the first amount of oxygen.

23. The controller of claim 22, wherein $O_{2est}$ is determined using the following formula:

$$O_{2est} = \beta(m_{\dot{E}GR}, T_{EGR}, P_{EGR}, m_{Intake}, T_{Intake}, P_{Intake}) \quad (II)$$

wherein:
$m_{\dot{E}GR}$ is a mass of exhaust gas recirculated into an engine cylinder;
$T_{EGR}$ is a temperature of the exhaust gas recirculated into the engine cylinder;
$P_{EGR}$ is a pressure of the exhaust gas recirculated into the engine cylinder;
$m_{Intake}$ is a mass of intake gas introduced into the engine cylinder;
$T_{Intake}$ is a temperature of the intake gas introduced into the engine cylinder; and
$P_{Intake}$ a pressure of the intake gas introduced into the engine cylinder.

* * * * *